United States Patent [19]
Nellis

[11] Patent Number: 4,815,637
[45] Date of Patent: Mar. 28, 1989

[54] CAP ASSEMBLY FOR USE WITH CANNED AEROSOL LUBRICANT

[76] Inventor: Russell L. Nellis, 2541 Gilead, Zion, Ill. 60099

[21] Appl. No.: 184,574

[22] Filed: Apr. 21, 1988

[51] Int. Cl.⁴ .............................................. B65D 83/14
[52] U.S. Cl. .................................. 222/402.12; 222/182
[58] Field of Search .................... 220/85 SP; 222/182, 222/402.12, 402.13

[56] References Cited

U.S. PATENT DOCUMENTS

| | | | |
|---|---|---|---|
| 3,323,695 | 6/1967 | Monahon | 222/402.13 |
| 3,853,248 | 12/1974 | Williamson | 222/402.12 |
| 3,927,806 | 12/1975 | Meshberg | 222/402.12 |
| 4,506,808 | 3/1985 | Goncalres | 222/182 |

Primary Examiner—George T. Hall
Attorney, Agent, or Firm—Thomas R. Vigil

[57] ABSTRACT

The cap assembly is used for directing a concentrated foam of lubricant from an aerosol can to areas of a drive chain between lateral link plates thereof. The cap assembly comprises a cap having means for engaging an upper end of a can of aerosol lubricant. An arm extends radially outwardly from the cap, the arm including a distal end portion having outlet means for directing a concentrated foam of lubricant to either side of a roller of the drive chain between lateral link plates of the drive chain. Supply means are also provided within the cap and arm for connecting the distal outlet means of the arm to the outlet of a spray head of the aerosol can of lubricant.

22 Claims, 4 Drawing Sheets

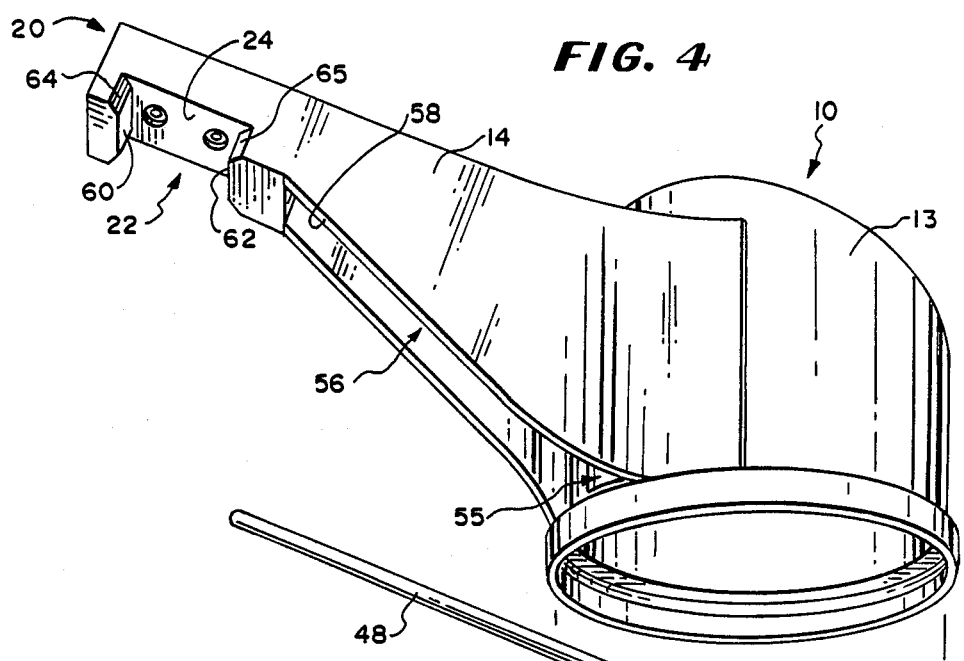
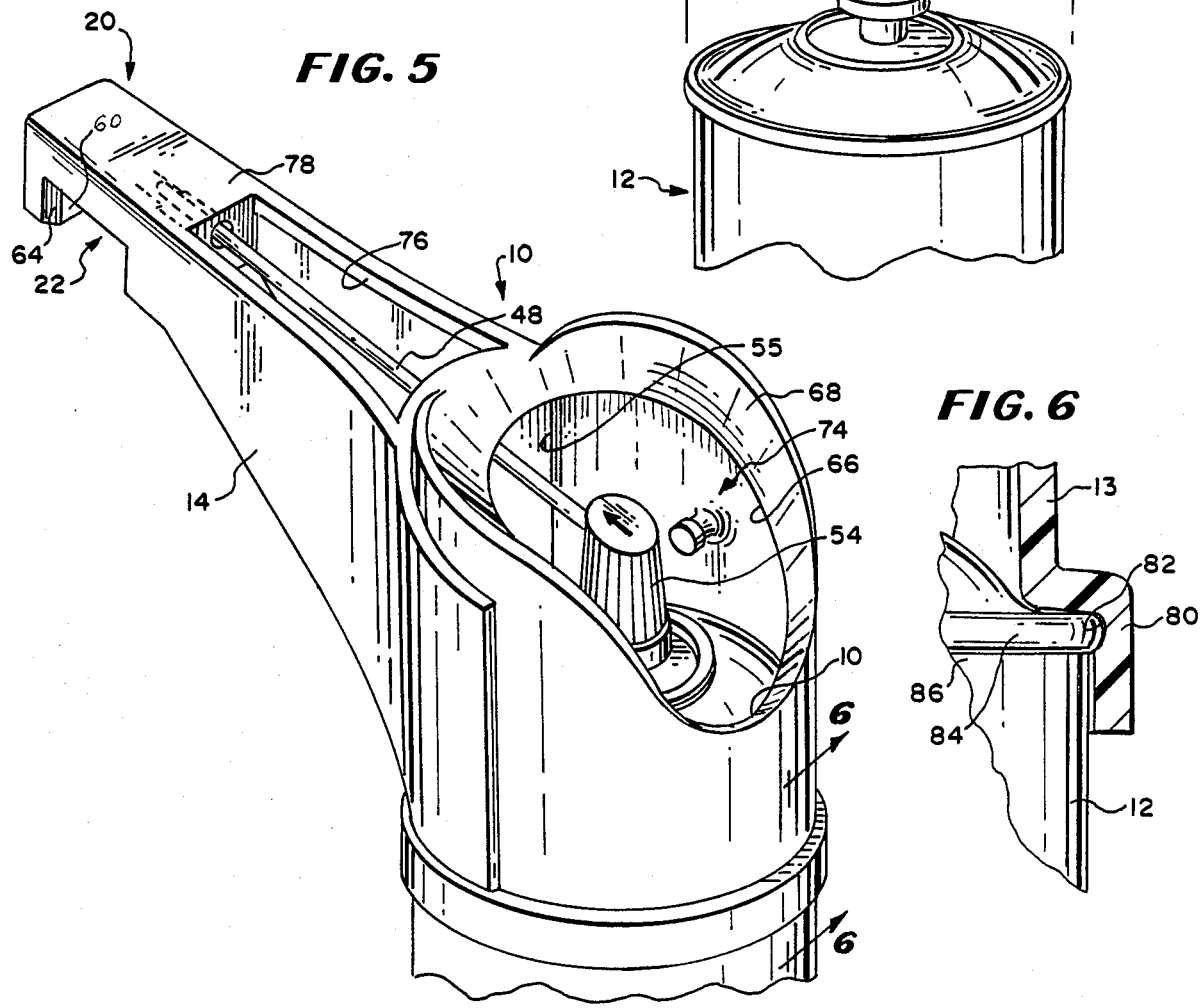
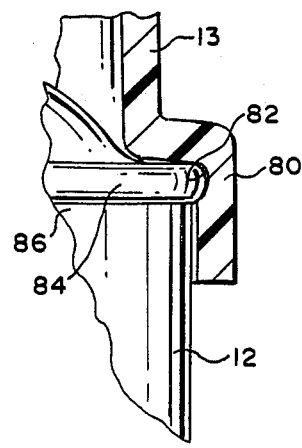

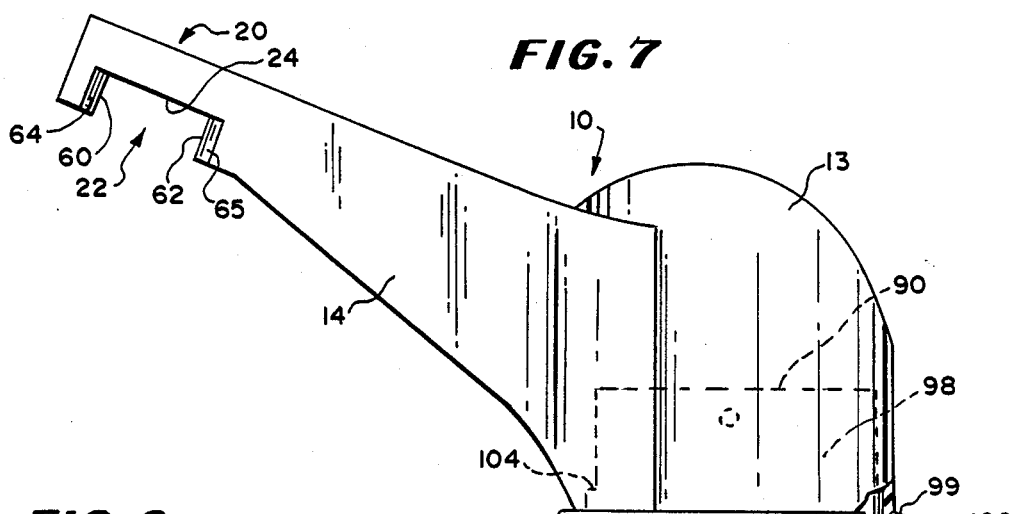
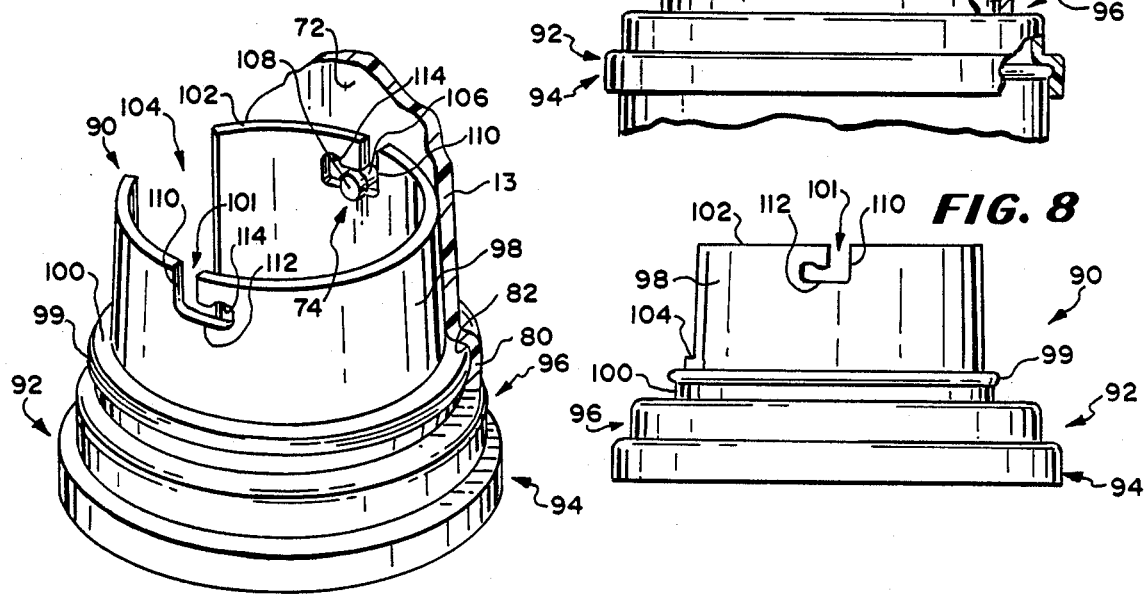
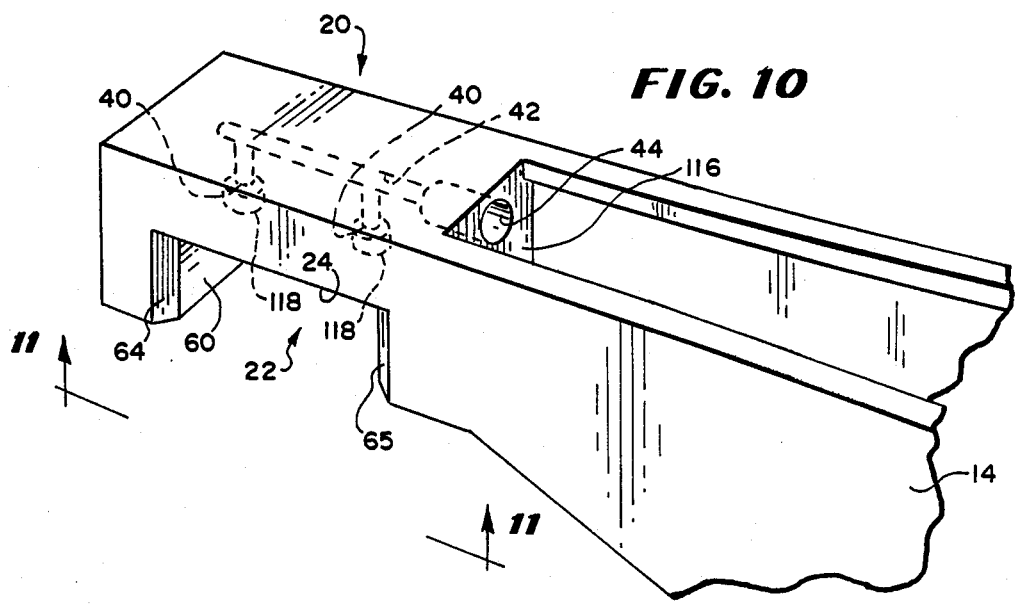

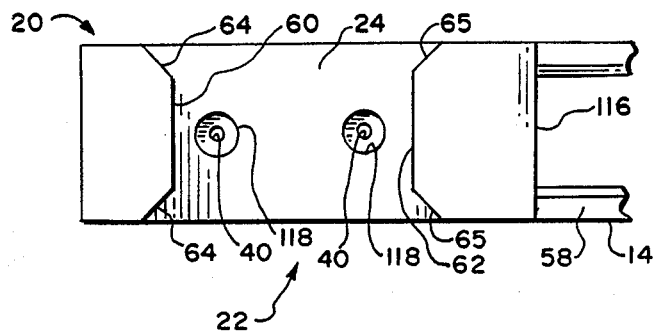
FIG. 11
FIG. 12
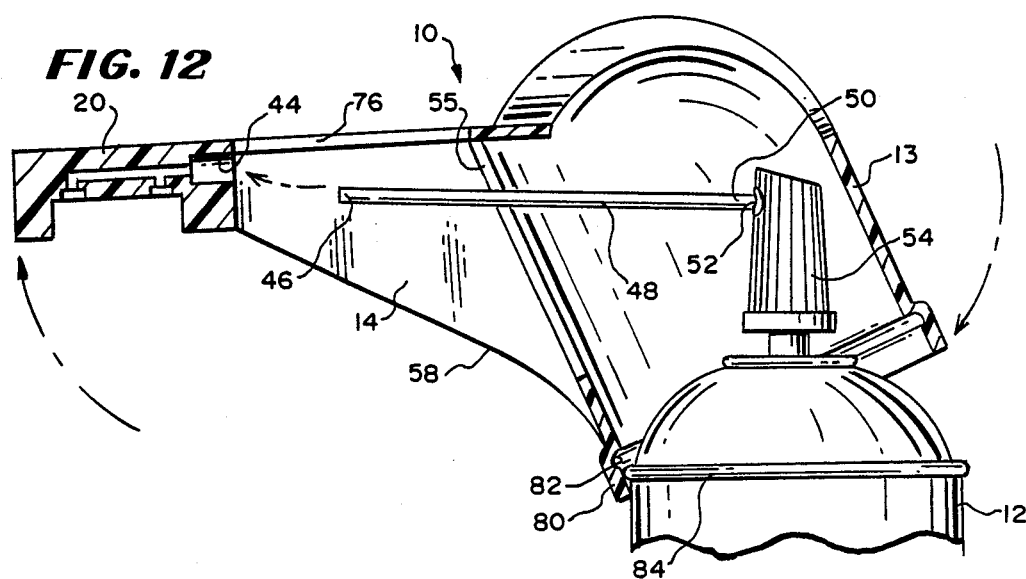
FIG. 13
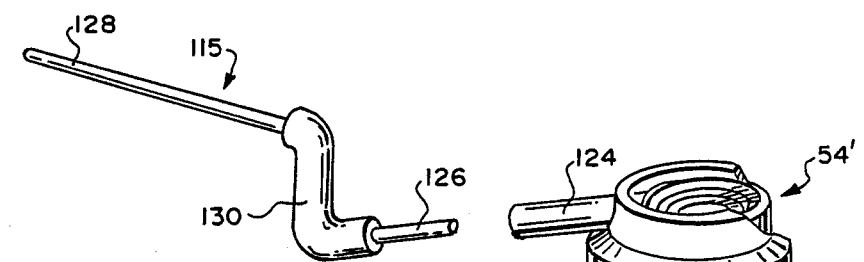

CAP ASSEMBLY FOR USE WITH CANNED AEROSOL LUBRICANT

BACKGROUND OF THE INVENTION

1. Field of the Invention

The invention relates to a cap assembly for use with a can of aerosol lubricant, such as a lubricant for drive chains. More particularly, the invention relates to a cap assembly which is fitted over the top of the aerosol spray can and is adapted to concentrate and direct the lubricant into contact with lateral pairs of link plates of the drive chain and to create a foam from the aerosol lubricant which will not only lubricate the area between the link plates but will also lubricate the roller area of the chain between lateral pairs of link plates, without loss of the lubricant into the air during use of same.

2. Background of the Invention

Heretofore it has been proposed to provide a device for specifically directing a lubricating material onto a chain, such as a drive chain for a motorcycle.

Examples of such lubricant directing devices are disclosed in the following U.S. Patents:

| U.S. Pat. No. | Patentee |
| --- | --- |
| 3,934,677 | Schott et al. |
| 4,120,380 | Mann |

The Schott et al. U.S. Pat. No. 3,934,677 discloses a magnet for guiding a lubricating head along a chain to be lubricated. The lubricating head is releasably engaged to a source of aerosol lubricant by flexible hoses and the lubricating head is releasably retained in sliding engagement with the chain by a magnet. Guides are provided for longitudinal alignment of the lubricating head relative to the chain so that the lubricating head rides along the chain as the chain is being turned to lubricate same upon actuation of a release valve of the source of aerosol lubricant. The lubricant source, or can, is aligned over the flight of the chain during use of the lubricating head. After use, the lubricating head is removed from engagement with the chain and may be engaged onto the lubricant can by the magnet.

The Mann U.S. Pat. No. 4,120,380 discloses an oiler for motorcycle drive chains comprising a chamber for holding a can of pressurized oil and a cap including a plunger which, when activated, causes actuation of the valve of the oil can to release oil therefrom. The chamber is mounted onto frame members of the motorcycle and aligned over the flight of the chain and a cable is provided which can be pulled to cause release of oil from the can via a flexible discharge tube, forming a port for the cap, onto the chain of the motorcycle.

As will be described in greater detail hereinafter, the cap assembly of the present invention differs from the previously proposed lubricating or lubricant directing devices by providing means for foaming, concentrating and directing an aerosol lubricant onto a drive chain so that the lubricant is forced between the lateral link plates of the chain in the form of a foam, with the foam flowing over the lateral link plates and onto the rollers to provide for lubrication of the rollers. The aerosol can of lubricant is held away from the motorcycle and a bridge member of the assembly extends radially away from the can and is positioned at right angles to the flight of the chain, simplifying the application of the lubricant by making alignment of the source of the lubricant directly over the flight of the chain unnecessary.

SUMMARY OF THE INVENTION

According to the invention there is provided a cap assembly for and directing a concentrated foam of lubricant from an aerosol can to areas of a drive chain between lateral link plates thereof, said cap assembly comprising:

a cap having means for engaging an upper end of a can of aerosol lubricant;

an arm extending radially outwardly from the cap, said arm including a distal end portion having outlet means for directing a concentrated foam of lubricant to either side of a roller of the drive chain between lateral link plates of the chain; and supply means within the cap and arm for connecting the distal outlet means of the arm to an outlet of a spray head of the aerosol can of lubricant.

BRIEF DESCRIPTION OF THE DRAWINGS

FIG. 4 is a lateral perspective view of the cap assembly of the present invention dissociated from the aerosol can with which it is to be used.

FIG. 5 is a perspective top view of the cap assembly of the present invention and shows an opening provided in a cap of the assembly for allowing actuation of the valve of the aerosol can.

FIG. 6 is a sectional view through a bottom lip or flange section of the cap and shows means for attaching the cap assembly onto the can of aerosol lubricant.

FIG. 7 is a lateral view of the cap assembly of the present invention and shows the cap mounted onto a second embodiment of an aerosol spray can using an adapter of the assembly.

FIG. 8 is a lateral view of the adapter shown in FIG. 7.

FIG. 9 is a perspective view of the adapter shown in FIGS. 7 and 8 and shows the cap of the present invention secured to the adapter.

FIG. 10 is a perspective view of a distal end portion of an arm of the cap assembly and shows outlet means of the distal end portion in phantom.

FIG. 11 is a bottom plan view of the distal end portion of the arm of the cap assembly.

FIG. 12 is a lateral sectional view of the cap assembly of the present invention and shows the cap assembly being engaged onto an aerosol can.

FIG. 13 is a perspective view of a modified embodiment of a supply tube of the cap assembly of the present invention.

DESCRIPTION OF THE PREFERRED EMBODIMENTS

Figure 1:
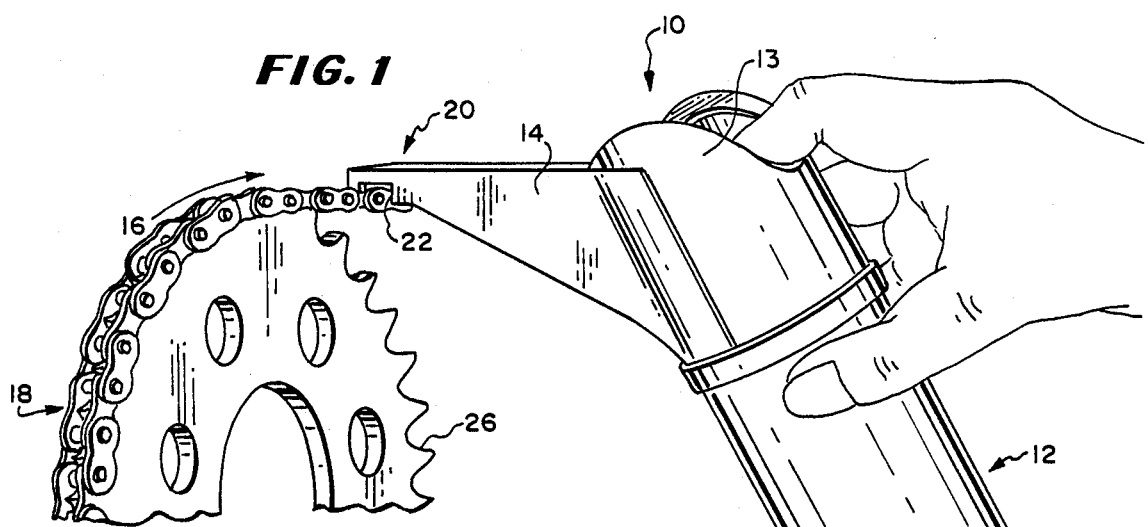
FIG. 1 is a perspective view of an aerosol can of lubricant having the cap assembly of the present invention mounted thereon in use in lubricating a drive chain.

Referring to the drawings in greater detail, FIG. 1 shows a cap assembly 10 made in accordance with the teachings of the present invention mounted on a can 12 of aerosol spray. The cap assembly 10 includes a cap 13 and an arm 14 extending radially outwardly and upwardly from the cap 13, which, when the cap assembly 10 is in use, extends perpendicular to the flight, at 16, of a drive chain 18 with a distal end portion 20 of the arm 14 extending laterally over the chain 18. A recess 22 is provided in the distal end portion 20 of the arm 14 for receiving the chain 18 therein, with the flight 16 of the chain 18 passing across a bottom wall 24 (FIGS. 3 and 4) of the recess 22.

Figure 2:
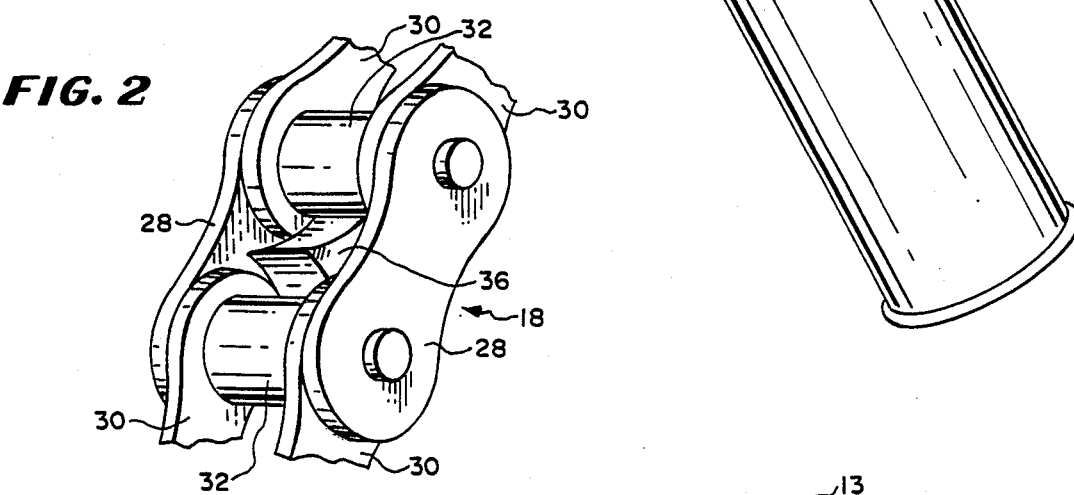
FIG. 2 is an enlarged perspective view of the various components of a section of the drive chain.

As shown in FIG. 2, the drive chain 18 comprises several components which move relative to one another and relative to a drive gear 26 (FIG. 1) and which, to extend the life of the chain 18, should be kept lubricated to minimize friction caused by such movement. The drive chain 18 includes pairs of pin link plates 28 which join pairs of roller link plates 30 together, with the roller link plates 30 mounting rollers 32 which are mounted on bushings 34 which join parallel roller link plates 30 together. The rollers 32 engage about teeth 36 of the drive gear 26, the teeth 36 causing the chain 18 to move along its flight 16 when the gear 26 is engaged to a motor (not shown).

Figure 3:
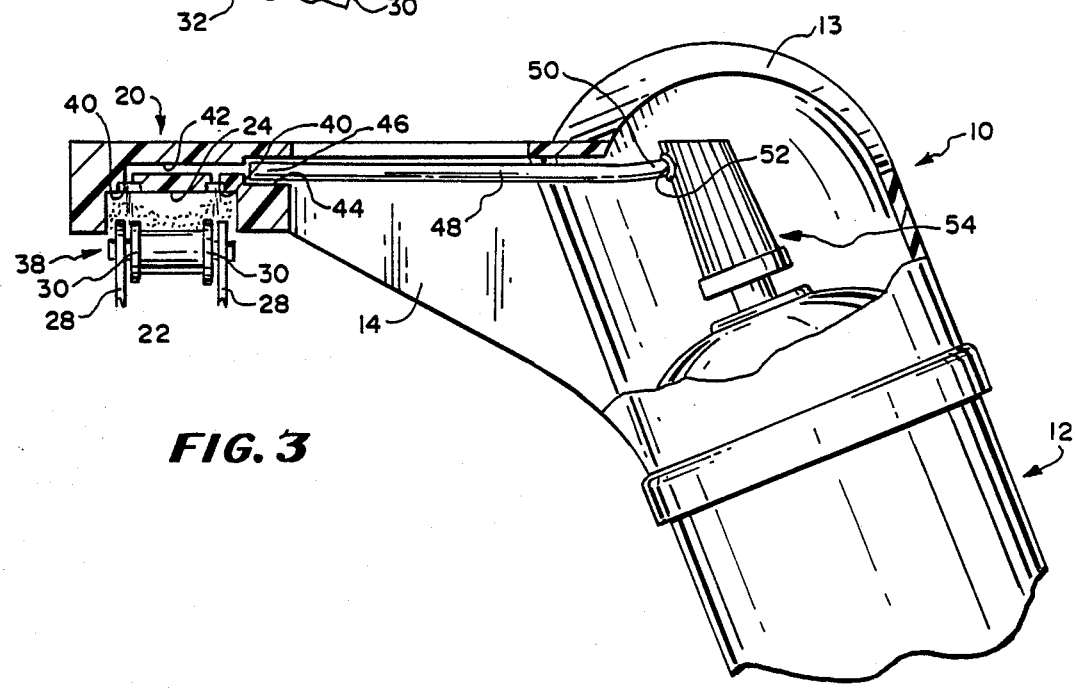
FIG. 3 is a lateral view through the cap assembly of the present invention, with portions broken away, and shows lubricant being applied to a drive chain section.

Turning now to FIG. 3, there is shown therein the cap assembly 10 in lateral cross section and a joint 38 between a pair of pin link plates 28 and a pair of roller link plates 30 positioned within the recess 22 and nearly against the bottom wall 24 of the recess 22. The recess 22 is shown to be slightly above the chain 18 to better show the foaming of the lubricant being applied using the cap assembly 10 and it is to be understood that during use of the cap assembly 10, the bottom wall 24 of the recess 22 rests flush against the chain 18.

As shown, the distal end portion 20 of the arm 14 has two outlet bores 40 extending upwardly from the bottom wall 24 of the recess 22 into the distal end portion 20 where they join a common passageway 42 in the distal end portion 20 extending toward the can 12 of aerosol spray. The distal end portion 20 is provided with a countersunk proximal end bore 44 which mates with the passageway 42 and is sized and configured to receive a distal end 46 of a supply tube 48 therein. A proximal end 50 of the supply tube 48, as will be described hereinafter, is coupled to an outlet port 52 of a sprayer head or valve 54 of the aerosol spray can 12.

In FIG. 4, the cap 13 and supply tube 48 are shown detached from the can 12.

The cap 13 has a side opening 55 therein which is straddled by the arm 14 which has spaced apart walls forming a space 56 for receiving the supply tube 48 therethrough. This space 56 extends to a bottom side 58 of the arm 14 for easing insertion and engagement of the supply tube 48. The arm 14 is bifurcated in this matter between the cap 13 and the distal end portion 20.

The bottom wall 24 of the recess 22 in the distal end portion 20 of the assembly 10 has the two bores 40 therein spaced from each other a predetermined distance so that each bore is aligned over the space between a link plate 28 and a roller plate 30 on one side of the chain 18, as shown in FIG. 3. The recess 22 also has distal and proximal end walls 60 and 62, respectively, which act as chain guides, and the side edge 64, 65 of each wall 60, 62 is chamfered so that the chain 18 travels smoothly within the recess 22 without catching on the edges 64, 65 of the end walls 60 or 62.

In FIG. 5, there is shown a top view of the cap assembly 10. As shown, the cap 13 has an opening 66 in the top thereof with the opening 66 having a tapered surface 68 angling downwardly at 70 into a back wall of the cap 13 opposite to the arm 14. This opening 66 allows access to the spray head 54 of the can 12 to allow actuation thereof. The cap 13 also has on an inside surface 72 two oppositely located pins 74 which are positioned 90° around the cap 13 from the arm 14. The use of these pins 74 will be described in connection with the description of FIGS. 7-9.

The side opening 55 in the wall of the cap 13 is best shown in FIG. 5 and with the space 56 provides an uninterrupted path for the supply tube 48 from the sprayer head 54 to the distal end portion 20 of the arm 14.

The arm 14 has a second opening 76 in a top surface 78 thereof to further ease the process of positioning the supply tube 48, thereby making the arm 14 a hollow structure.

The cap assembly 10, for ease of mounting onto the can 12 is attached by a snap lock action. As shown in FIG. 6, a lower outwardly offset flange 80 of the cap 13 has formed in an inner surface thereof an annular notch or groove 82 which provides a simple means for snap locking the cap assembly 10 onto the can 12 by engagement of the notch 82 about a circumferential top seam or rib 84 in an upper rim portion 86 of the can 12.

Cans 12 of lubricant, such as used in oiling motorcycle drive chains 18, are not all identical.

For example, cans 12 of lubricant may be of at least two known diameters and the spray head 54 may have one of at least three presently known embodiments. To make the cap assembly 10 of the present invention adaptable for use with the most popular lubricant can embodiments, a mounting sleeve 90, as shown in FIGS. 7-9 can be provided.

In this respect, the cap 13 of the cap assembly 10 is sized to lock onto the smallest known diameter can 12 of lubricant and the mounting sleeve 90 will allow for engagement of the cap assembly 10 onto one or more larger known diameter cans 12.

The sleeve 90, as shown in FIG. 7, has a multi-tiered outwardly stepped lower end 92, with the diameter of a lowermost tier 94 of the lower end 92 being sized to accommodate the largest known diameter for a can 12 of lubricant with the intermediate or upper tiers 96 being sized to accommodate cans 12 of intermediate diameter.

The sleeve 90 has a cylindrical body portion 98 which extends upwardly from the uppermost tier 96 and is sized to fit snugly into the cap 13, as shown in phantom in FIG. 7.

The sleeve 90, as better shown in FIG. 8, has a circumferential rib 99 extending around a base 100 of the body portion 98. This rib 99 is received in the notch 82 of the flange 80 of the cap 13 in a snap fit manner. To ensure secure engagement of the cap 13 and sleeve 90, so that the cap 13 does not slip off the sleeve 90 during use, two oppositely disposed L-shaped cutouts 101 are provided extending downwardly from a top edge 102 of the sleeve body portion 98.

As best shown in FIG. 9, a section 104 of the cylindrical body portion 98 of the sleeve 90 is cut away to form an opening 104 in the body portion 98. This opening 104 is aligned with the side opening 55 in the cap 13 and is provided so that the attachment of the sleeve 90 to the cap 13 will not interfere with the path for the supply tube 48.

The L-shaped cutouts 101 are each placed approximately 90° around the cylindrical wall from the opening 104, directly opposite one another, and are so located to engage onto the pins 74 on the interior surface 72 of the cap 13 providing a bayonet mounting of the sleeve 90 to the cap 13.

Each cutout 101 is sized to engage about a stem portion 106 of one of the pins 74 and a larger-in-diameter head 108 of each pin 74 keeps the cutouts 101 from disengaging from the pins 74.

In attaching the sleeve 90 to the cap 13, the body portion 98 of the sleeve 90 is slid upwardly into the cap 13 with the sleeve 90 positioned so that the opening 104 faces the arm 14 and an upwardly extending leg 110 of the L-shaped cutouts 101 is aligned beneath the pins 74 of the cap 13. The sleeve 90 is then pushed upwardly until the pins 74 of the cap 13 rest along a horizontal lower leg 112 of each L-shaped cutout 101 and the circumferential rib 99 of the sleeve 90 simultaneously snaps into engagement with the notch 80 in the lip 82 of the cap 13.

Once vertical alignment is completed, the sleeve 90 is rotated relative to the cap 13 to set each pin 74 within an end notch 114 of the horizontal leg 112 of the respective L-shaped cutout 101 to lock the sleeve 90 and cap 13 together.

To adapt the cap assembly 10 for use with various embodiments of spray valves or heads 54, more than one supply tube 48 can be included for use in the assembly 10.

For example, the outlet port or opening 52 in the spray head 54 can be of two presently known diameters. To accommodate either outlet port opening 52, two elongate supply tubes 48, each having an outer diameter to accommodate one port opening 52 may be provided.

Further, as will be described in connection with FIG. 13, a third, uniquely configured supply tube 115 may be provided to accommodate a completely different sprayer head or valve 54', making the cap assembly 10 a universal, "fits-all" assembly 10.

FIG. 10 shows in detail the inner structure of the distal end portion 20, in phantom.

It is to be understood that the distal end 46 of the supply tube 48 must be accommodated within the countersunk proximal end bore 44 of the distal end 20 to form a complete path for the aerosol lubricant exiting the can 12.

For this purpose, the end bore 44 is provided within the distal end portion 20 and extends thereinto from a proximally or rearwardly facing end wall 116 of the distal end portion 20, the countersunk end bore 44 being sized to receive the largest diameter supply tube 48 to be used therewith. The end bore 44 communicates with the passageway 42 which feeds the outlet bores 40. Preferably, the bore 44 is sized to receive therein the distal end 46 of the larger in diameter supply tube 48 in a snug, friction fit manner to prevent leakage (FIG. 3) and the passageway 42, on the other hand, is sized to receive the distal end 46 of the smaller in diameter supply tube 48 therein in a snug, friction fit manner (shown in phantom in FIG. 5).

As best shown in FIG. 11, the outlet bores 40 have a countersunk, larger in diameter outflow chamber 118 provided to keep the outlet bores 40 from becoming clogged by the aerosol lubricant which foams out of the bores 40. It has been shown through empirical testing that the foaming of the lubricant is best enhanced when the outlet bores 40 are no greater than 1/32 inch in diameter, with a diameter of 1/64 inch being preferred. Also it is to be understood that the bores 40 are separated from one another by a specific distance, the distance being equal to the distance between the joints 38 of lateral pairs of link plates 28, 30 of the chain 18 being lubricated.

The chamfered side edges 64, 65 of the walls or chain guides 60 and 62 of the recess 22 which allow the chain 18 to move freely without obstruction against the undersurface 24 are also best shown in FIG. 10.

FIG. 12 shows the cap assembly 10 being mounted onto an aerosol can 12. The proximal end 50 of the supply tube 48 is first placed within the outlet opening 52 of the spray valve or head 54. The user then places the cap 13 over the supply tube 48 and can 12 in such a manner as to have the supply tube 48 received within and through the side opening 55 of the cap 13.

This is accomplished by holding the arm 14 of the cap assembly 10 horizontal, with the can 12 being held vertical, and then sliding the cap 13 over the supply tube 48 and over the can 12. Then, the cap 13 is tilted to rotate the arm 14 to an upwardly disposed angle with the flange 80 of the cap 13 being pressed over and into engagement with the seam 84 of the can 12. Once the cap 13 is snap locked onto the can 12, the user can use his fingers to insert the distal end 46 of the supply tube 48 into the countersunk bore 44 of the distal end 20 of the cap assembly 10. The user may easily access the distal end 46 of the supply tube 48 through the upper opening 76 in the arm 14 and through the opening 56 in the bottom wall 58 of the arm 14.

FIG. 13 shows a final known embodiment of an aerosol can 12' which may be used with the cap assembly 10 of the present invention. In this embodiment 12', a spray head 54' having a cylindrical nozzle 124 extending therefrom is shown, with the nozzle 124 being downwardly directed.

In order to accommodate such a downwardly angled nozzle 124 the cap assembly 10 may be provided with the modified supply tube 115.

As shown, this modified supply tube 115 includes two sections of semi-rigid tubing 126 and 128 which are joined to one another by a flexible sleeve 130. This flexible sleeve 130 has an internal diameter which holds the tubing sections 126 and 128 therein by a friction fit and is provided to redirect the outflow from the downwardly directed nozzle 124 upwardly, for use with the cap assembly 10.

It is to be noted that the arm 14 of the cap assembly 10 is directed angularly upwardly so that the user may place the bottom wall 24 of the recess 22 of the distal portion 20 along the flight 16 of the chain 18 and hold the can 12 angularly away from the chain 18 for safety so that the user's hand does not come close to the chain 18, as shown in FIG. 1, while the chain 18 is being turned.

Further, since the distal portion 20 of the assembly 10 is of a nominal width, a chain cover, provided on most motorcycles or bicycles, does not need to be removed since only a small width of the flight 16 of the chain 18 must be exposed for lubrication with the cap assembly 10.

The job of lubricating the chain 18 is further eased with the cap assembly 10 since the can 12 of aerosol lubricant may be held alongside or perpendicular to the flight 16 of the chain 18 rather than over and parallel to the flight 16 of the chain 18, as with previously proposed lubricant dispensing devices. Also, a substantial saving in lubricant used is obtained with the cap assembly 10 inasmuch as the lubricant is concentrated and directed to the area of the chain 18 between the lateral link plates 28 and 30 of the chain 18 and foams over the rollers 32 thereof, rather than being discharged from the aerosol can 12 in a manner which will disperse the lubricant into the air around the chain 18.

From the foregoing description, it will be apparent that the cap assembly 10 of the present invention has a number of advantages, some of which have been described above and others of which are inherent in the invention. Also, modifications can be made to the cap assembly 10 without departing from the teachings of the present invention. Accordingly, the scope of the invention is only to be limited as necessitated by the accompanying claims.

I claim:

1. A cap assembly for foaming a lubricant exiting an aerosol can and directing a concentrated foam of the lubricant to areas of a drive chain between lateral link plates thereof, said cap assembly comprising:
   a cap having means for engaging an upper end of a can of aerosol lubricant;
   an arm extending radially outwardly from the cap, said arm including a distal end portion having outlet means for directing a concentrated foam of lubricant to either side of a roller of the drive chain between lateral link plates of the chain; and
   supply means within the cap and arm for connecting the distal outlet means of the arm to an outlet of a spray head of the aerosol can of lubricant.

2. The cap assembly of claim 1 wherein said cap includes a bottom flange having an annular groove on an inner surface thereof for locking onto a top end seam (rib) of an aerosol can.

3. The cap assembly of claim 1 wherein said cap has an opening in the sidewall thereof.

4. The cap assembly of claim 3 wherein said arm is bifurcated and said opening in said sidewall of said cap is surrounded by said arm.

5. The cap assembly of claim 4 wherein said arm has two spaced solid sidewalls.

6. The cap assembly of claim 1 wherein said distal end portion of said arm is solid and wherein said outlet means comprise a primary bore extending distally into said distal end portion and two secondary bores in said distal end portion in communication with said primary bore and extending downwardly therefrom.

7. The cap assembly of claim 6 wherein said primary bore has a countersunk proximal opening in a rear wall of said distal end portion which faces said cap.

8. The cap assembly of claim 6 wherein said secondary bores have countersunk outlet end openings.

9. The cap assembly of claim 8 wherein said countersunk outlet end openings open onto a bottom wall of a recess in said distal end portion.

10. The cap assembly of claim 8 wherein said secondary bores are spaced from each other a distance equal to the distance between pairs of lateral link plates of said drive chain.

11. The cap assembly of claim 9 wherein said bottom wall of said recess in said distal end portion is bounded by distal and proximal end walls which extend downwardly from the bottom wall and have chamfered side end edges.

12. The cap assembly of claim 10 wherein said bottom wall of said recess between said distal and proximal end walls has a length slightly greater than the width of a drive chain.

13. The cap assembly of claim 8 wherein said secondary bores are no greater than 1/32 inch in diameter.

14. The cap assembly of claim 8 wherein said secondary bores are approximately 1/64 inch in diameter.

15. The cap assembly of claim 1 further including a sleeve member having a multitiered outwardly flanged lower portion and an upwardly extending main body portion.

16. The cap assembly of claim 15 wherein the lowest flange of said flanged lower portion has a peripheral notch therein for locking onto a top end seam of an aerosol can.

17. The cap assembly of claim 15 wherein said main body portion is cylindrical and fits snugly within said cap.

18. The cap assembly of claim 15 wherein said sleeve has means thereon for locking said sleeve to said cap.

19. The cap assembly of claim 18 wherein said locking means of said sleeve include cutouts provided along an upper end edge of said main body portion of said sleeve which coact with pins extending from an inner wall surface of said cap.

20. The cap assembly of claim 15 wherein a rib is provided along a base portion of said sleeve, said rib interlocking with the notch on said cap.

21. The cap assembly of claim 1 wherein said supply means comprise a tubing having a distal end which is accepted in a bore in the distal end of the arm and a proximal end which is connected to an outlet of the spray head of the aerosol can of lubricant.

22. The cap assembly of claim 21 wherein said supply means comprise two sections of tubing connected by a deformable sleeve.

* * * * *